UNITED STATES PATENT OFFICE.

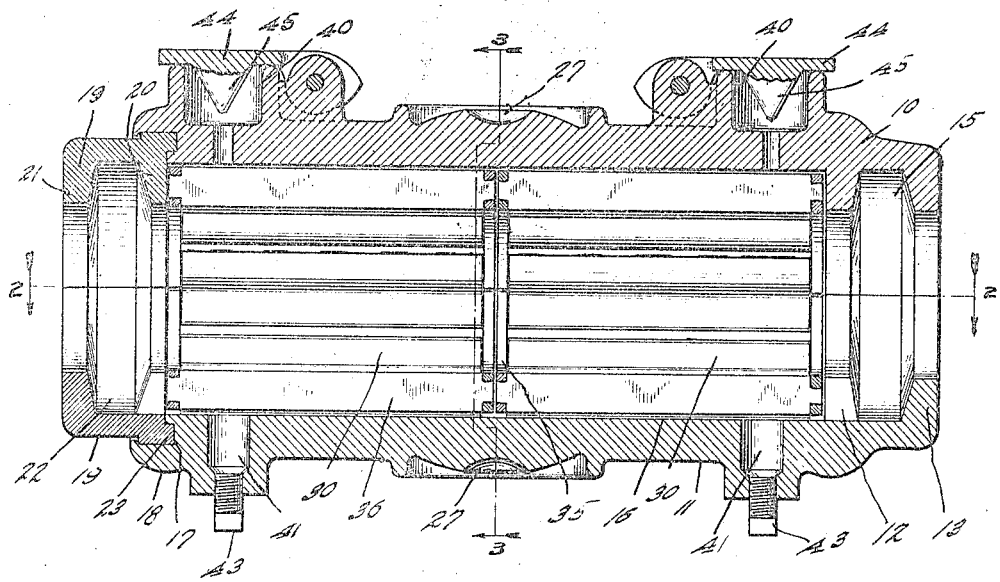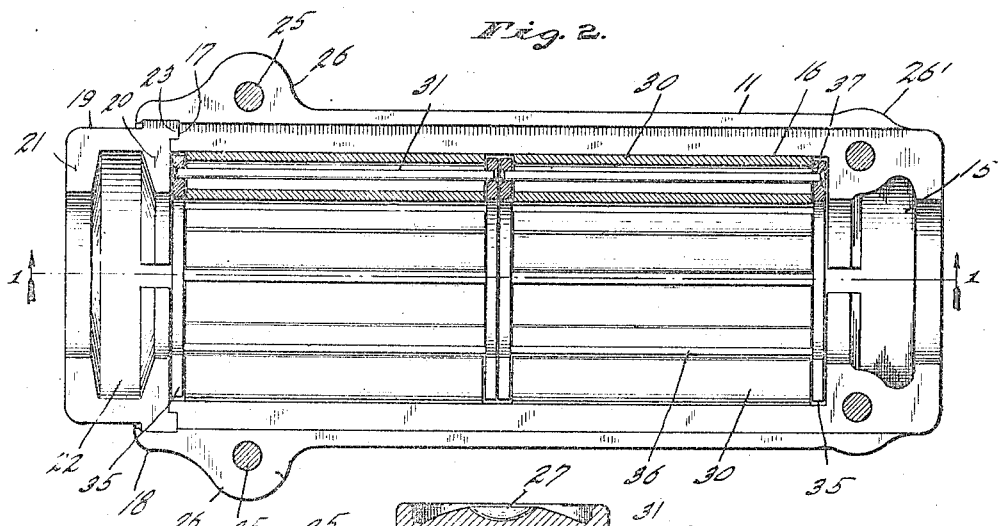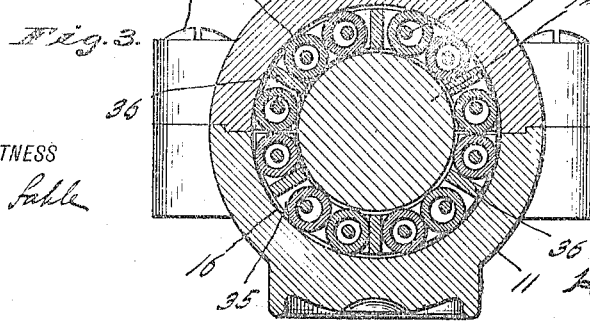

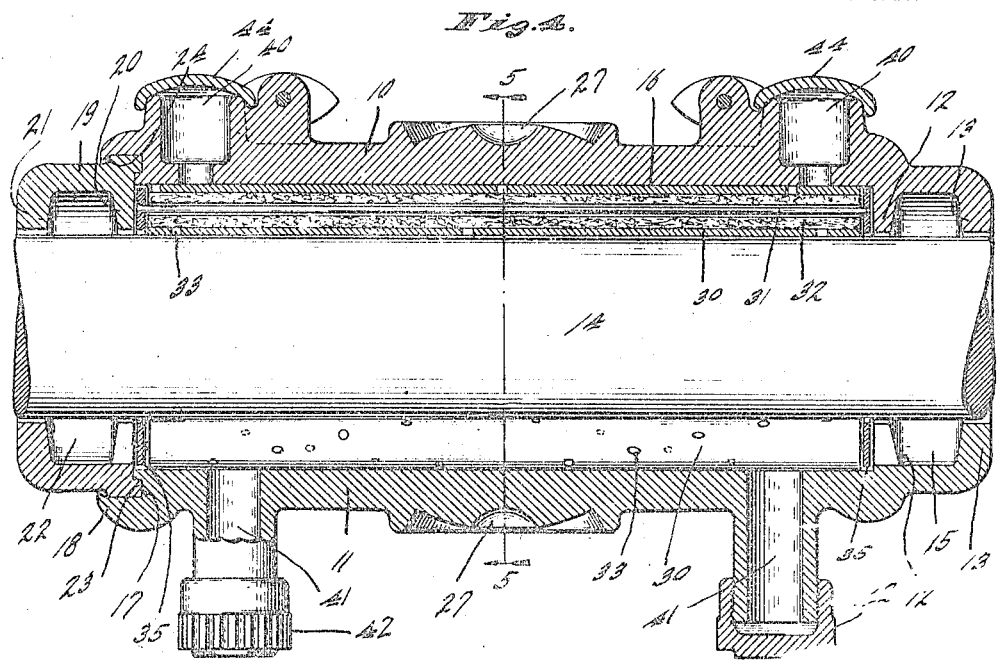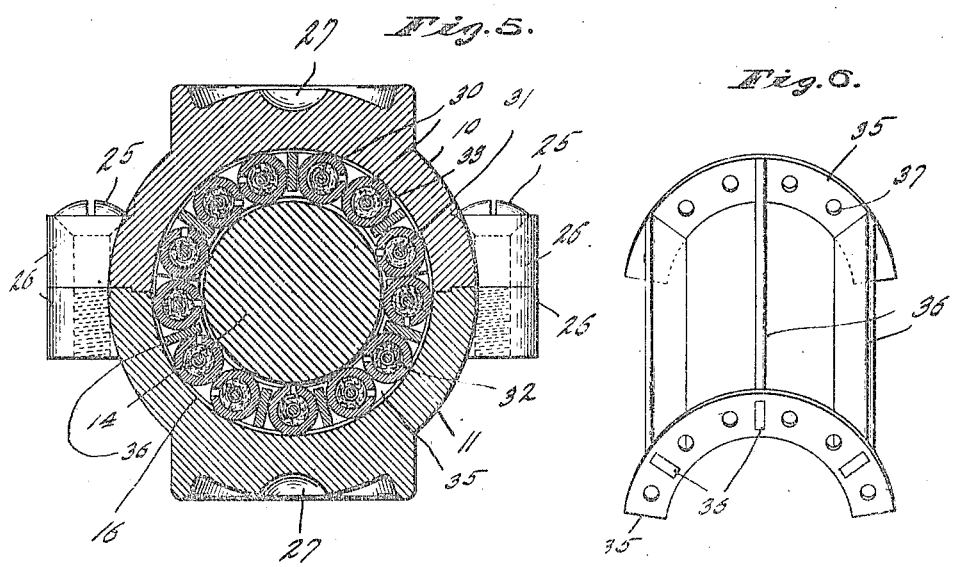

MILTON O. REEVES, DARCY E. LEWELLEN, AND LENNIOUS P. EVERROAD, OF COLUMBUS, INDIANA, ASSIGNORS TO REEVES PULLEY COMPANY, OF COLUMBUS, INDIANA, A CORPORATION OF INDIANA.

ROLLER-BEARING.

1,196,288.  Specification of Letters Patent.  Patented Aug. 29, 1916.

Application filed December 2, 1915.  Serial No. 64,612.

*To all whom it may concern:*

Be it known that we, MILTON O. REEVES, DARCY E. LEWELLEN, and LENNIOUS P. EVERROAD, citizens of the United States, residing at Columbus, in the county of Bartholomew and State of Indiana, have invented a new and useful Roller-Bearing, of which the following is a specification.

It is the object of our present invention to provide a roller bearing which can be constructed cheaply with a body of cast iron, which is well lubricated and self-cleaning, which permits the ready assembling of the parts, and which is adapted for easy mounting in the hanger.

The accompanying drawings illustrate our invention.

Figure 1 is a vertical axial section through a roller bearing embodying the preferred form of our invention, being taken on the line 1—1 of Fig. 2; Fig. 2 is a section on the line 2—2 of Fig. 1, with two of the rollers also in section in order to show their construction; Fig. 3 is a section on the line 3—3 of Fig. 1; Fig. 4 is a view similar to Fig. 1, showing a slightly modified form of our invention; Fig. 5 is a section on the line 5—5 of Fig. 4; and Fig. 6 is a view of the upper half of the bearing cage in the modification shown in Fig. 4.

The bearing casing comprises upper and lower mating main members 10 and 11 which are provided near one end with spaced inwardly projecting flanges 12 and 13 extending inward nearly to the shaft 14 and providing a chamber 15 between them, for minimizing the loss of lubricant along the shaft. At the other end, the members 10 and 11 are open, so that their interior surface 16 may be drilled from such end to provide a smooth wall for the roller chamber. The ends of the members 10 and 11 are machined to form an annular groove 17 and an axially projecting flange 18 around the outer edge of such groove, and mating semi-annular end members 19 having inwardly projecting flanges 20 and 21 and a chamber 22 corresponding to the flanges 12 and 13 and the chamber 15 are together provided with an annular tongue 23 which may fit into the annular groove 17. When the end members 19 are put in place with the tongue 23 in the groove 17, the projecting edge of the flange 18 may be peened over an annular shoulder 24 on such end members 19 to hold such end members in place. The two main members 10 and 11 are held together by means of screws 25, which at the end provided with the end members 19 are carried in coöperating lateral lugs 26 on such members 10 and 11. Preferably, however, these full-sized lugs 26 are not provided at the other end; but instead, in order to permit the bearing as a unit to be put in place endwise in the hanger, the holes for the bolts 25 at this end are placed nearer the center of the bearing, and partly in line with the roller chamber, which is permitted by the inwardly projecting flange 12, which may be thickened around the bolt holes as shown in Fig. 2, thus enabling the outward projection of the bosses 26' around the bolts at this end of the bearing to be sufficiently small so as not to interfere with the endwise insertion of the bearing as a unit into the hanger, as is clear from Fig. 2. The members 10 and 11 may be provided with any desired form of mounting, being shown as provided with standard recesses 27 for a hanger mounting. By this construction, a roller chamber is provided without excessive machining, for the parts 10, 11, and 19 may be made of cast iron and the inner surface 16 of the members 10 and 11 and the inner edges of the flanges 12, 13, 20, and 21 may all be formed by drilling, and the annular groove 17 and annular tongue 23 may be formed by very simple and inexpensive lathe work.

The inner surface 16 of the members 10 and 11 and the inner faces of the flanges 12 and 20, in coöperation with the shaft 14, form the chamber for the rollers. These rollers consist of tubes 30, longitudinally through which extend wires 31, which are considerably smaller than the interiors of the tubes 30. The spaces between the wires and the inner surfaces of the tubular rollers may be empty spaces, as in the arrangement shown in Figs. 1, 2, and 3, or they may be filled with a layer of felt 32, as in the arrangement shown in Figs. 4 and 5. When the rollers are long, and especially when the felt 32 is used, each roller may be provided with a number of transverse holes 33, conveniently arranged in a double helix, as is clear from Figs. 4 and 5. The rollers 30 may extend practically the full length of the roller chamber, or nearly the full distance between the flanges 12 and 20, as illustrated in Fig. 1; but we have found that the use of but one set of rollers, especially in long bearings, tends to produce corrugation of the shaft, and we therefore prefer to provide a plurality of independent groups of rollers, with the rollers of each group extending but a part of the length of the roller chamber, as in the arrangement shown in Figs. 1 and 2, where two groups of rollers are illustrated. Each group of rollers, whether there be one or more groups, is mounted in a cage, conveniently made in two parts for convenience in assembling. Each of these parts comprises arc-shaped end members 35 connected by bars 36, the arc-shaped end members being at the ends of the group or groups of rollers, and the bars 36 lie between the rollers. The dividing line between the two parts of the cage may be a diametrical line, as in the arrangement shown in Fig. 3, thus making the two cage parts identical, or may be slightly removed from the diameter, as in the arrangement shown in Fig. 5, thus making the two cage parts slightly different. The number of rollers which lie in the pockets between the bars 36 is not essential, a single roller being shown in the lowest pocket in the arrangement shown in Fig. 5, and two rollers in each of the other pockets. The wires 31 which extend axially through the rollers preferably pass through holes 37 in the arc-shaped members 35 and are riveted thereto, to prevent the rollers from dropping out in assembling or when the cage or cages are removed. The length of the roller chamber is substantially filled by the rollers and their cage or cages, whether one or more groups of rollers be used.

Lubricant is supplied through covered lubricant cups 40 near the ends of the upper main bearing member 10. This lubricant passes into the roller chamber and works around, along, and into the rollers. The lubricant which works into the rollers through the holes 33 is absorbed by the felt layers 32 when such are used, and carried thereby along the rollers to other holes 33, passing out through these other holes to the exterior surfaces of the rollers. Any dirt or grit which gets into the bearing is likewise worked along the rollers to wells 41 near the ends and at the bottom of the lower main bearing member 11, which wells are provided with removable caps 42 (Fig. 4) or removable plugs 43 (Fig. 1) for permitting cleaning. Loss of the lubricant in the roller chamber is largely prevented by the flanges 12, 13, 20, and 21. The flanges 12 and 20 are preferably notched at the bottom to permit any lubricant which gets into the chambers 15 and 22 to return to the roller chamber. The lubricant cups 40 are provided with hinged caps 44, which are preferably provided with depending projections 45 of an inverted cone shape whereby any lubricant which splashes up from the roller chamber into the cups 40 strikes such projections 45 and trickles down the sides of such projections to the points of the cones and then drops back into the roller chamber through the holes which connect such chamber with the cups 40.

We claim as our invention:

1. A roller bearing, comprising two mating main members provided at one end with flanges projecting inwardly toward the shaft and open at the other end so that the interior surface of such members may be formed by a drill inserted through such open end, and mating end members also provided with inwardly projecting flanges, said end members being mounted on the first two members at the open end thereof, said end members and said first two members being provided with a coöperating annular tongue and groove for relatively positioning them.

2. A roller bearing, comprising two mating main members provided at one end with flanges projecting inwardly toward the shaft and open at the other end so that the interior surface of such members may be formed by a drill inserted through such open end, and mating end members also provided with inwardly projecting flanges, said end members being mounted on the first two members at the open end thereof, said end members and said first two members being provided with a coöperative annular tongue and groove for relatively positioning them, said first two members being provided at their open end with an axially projecting annular flange extending over the end members, and the end members being provided with a shoulder over which the edge of said annular flange may be peened.

3. A roller bearing, comprising two mating main members provided at one end with flanges projecting inwardly toward the shaft and open at the other end so that the interior surface of such members may be formed by a drill inserted through such open end, and mating end members also provided with inwardly projecting flanges, said end members being mounted on the first two members at the open end thereof, said first two members being provided at their open end with an axially projecting annular flange extending over the end members, and the end members being provided with a shoulder over which the edge of said annular flange may be peened.

4. A roller bearing, comprising a plurality of tubular rollers, a cage in which the rollers are loosely carried, wires extending axially through the rollers and fastened to the cage to hold the rollers in the cage when the cage is removed, said wires being spaced from the interior surfaces of the rollers, and the rollers being slightly circumferentially movable in said cage and layers of felt surrounding such wires and located within the rollers.

5. A roller bearing, comprising a plurality of tubular rollers, a cage in which the rollers are loosely carried, wires extending axially through the rollers and fastened to the cage to hold the rollers in the cage when the cage is removed, said tubular rollers being slightly circumferentially movable in said cage and provided with transverse holes connecting their inner and outer surfaces.

6. A roller bearing, comprising a plurality of tubular rollers, a cage in which the rollers are loosely carried, wires extending axially through the rollers and fastened to the cage to hold the rollers in the cage when the cage is removed, said wires being spaced from the interior surfaces of the rollers and the rollers being slightly circumferentially movable in said cage, and layers of felt surrounding such wires and located within the rollers, said tubular rollers being provided with transverse holes connecting their inner and outer surfaces.

7. A roller bearing, comprising a plurality of tubular rollers, a cage in which the rollers are loosely carried, wires extending axially through the rollers and fastened to the cage to hold the rollers in the cage when the cage is removed, said wires being spaced from the interior surfaces of the rollers and the rollers being slightly circumferentially movable in said cage, and layers of felt surrounding such wires and located within the rollers, said tubular rollers being provided with transverse holes connecting their inner and outer surfaces, and a main casing structure surrounding said rollers and provided on its under side with a dirt-receiving well into which the rollers work dirt and grit which may get into the bearing.

8. A roller bearing, comprising two mating main members provided at one end with flanges projecting inwardly toward the shaft and open at the other end so that the interior surface of such members may be formed by a drill inserted through such open end, and mating end members also provided with inwardly projecting flanges, said end members being mounted on the first two members at the open end thereof, said end members and said first two members being provided with a coöperating annular tongue and groove for relatively positioning them, said first two members being provided at their open end with an axially projecting annular flange extending over the end members.

9. A roller bearing, comprising two mating main members provided at one end with flanges projecting inwardly toward the shaft and open at the other end so that the interior surface of such members may be formed by a drill inserted through such open end, and mating end members also provided with inwardly projecting flanges, said end members being mounted on the first two members at the open end thereof, said first two members being provided at their open end with an axially projecting annular flange extending over the end members.

In witness whereof, we have hereunto set our hands at Columbus, Indiana, this 27th day of November, A. D. one thousand nine hundred and fifteen.

MILTON O. REEVES.
DARCY E. LEWELLEN.
LENNIOUS P. EVERROAD.

Witnesses:
C. TYRRELL,
JNO. JEWELL.